(12) United States Patent
Tam et al.

(10) Patent No.: US 8,201,337 B2
(45) Date of Patent: *Jun. 19, 2012

(54) RECIPROCATING CUTTING TOOL WITH ORBITAL ACTION

(75) Inventors: Ramon Tam, Chicago, IL (US); Jaime Moreno, Wheeling, IL (US); Brian Ellis, Mundelein, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/654,784

(22) Filed: Jan. 18, 2007

(65) Prior Publication Data
US 2007/0186425 A1  Aug. 16, 2007

Related U.S. Application Data

(63) Continuation of application No. 10/603,300, filed on Jun. 25, 2003, now Pat. No. 7,234,243.

(51) Int. Cl.
*B27B 11/02* (2006.01)
(52) U.S. Cl. .................................. 30/393; 30/392
(58) Field of Classification Search .............. 30/392, 30/393, 394, 373, 374, 375, 376, 377; 83/747
See application file for complete search history.

(56) References Cited

U.S. PATENT DOCUMENTS

| | | | | |
|---|---|---|---|---|
| 2,775,272 | A | * | 12/1956 | Papworth ........................ 30/393 |
| 2,781,800 | A | * | 2/1957 | Papworth ........................ 30/374 |
| 2,839,101 | A | * | 6/1958 | Bork ............................... 30/392 |
| 2,931,402 | A | | 4/1960 | Papworth |
| 4,238,884 | A | | 12/1980 | Walton, II |
| 4,262,421 | A | | 4/1981 | Bergler et al. |
| 4,545,123 | A | | 10/1985 | Hartmann |
| 4,628,605 | A | | 12/1986 | Clowers |
| 4,693,009 | A | | 9/1987 | Bone |
| 5,819,421 | A | | 10/1998 | Giacometti et al. |
| 6,230,411 | B1 | | 5/2001 | Wall et al. |
| 6,370,781 | B1 | | 4/2002 | Sasaki |

(Continued)

FOREIGN PATENT DOCUMENTS
DE  2 303 532  8/1974
(Continued)

OTHER PUBLICATIONS

Skil Jigsaw Model F012445500 (4455) drawing, S-B Power Tool Company, Aug. 1997.

(Continued)

*Primary Examiner* — Hwei C Payer
(74) *Attorney, Agent, or Firm* — Greer, Burns & Crain, Ltd.

(57) ABSTRACT

A reciprocating cutting tool configured for orbital cutting, includes a housing, a power source disposed in the housing, a main linkage connected to the power source and to a blade for driving the blade in a vertically reciprocating motion, a foot plate connected to the housing and including a portion in operational relationship to the blade, a swivel bracket connected to the foot plate and disposed to exert an orbital force to a rear edge of the blade. A plunger is secured within the housing and connected to the linkage for reciprocating, pivotal and rotational movement, and has an end configured for receiving a blade. A selector mechanism for selecting at least between pivotal and rotational movement of the plunger, wherein the pivotal movement relates to orbital blade motion, and the rotational movement relates to scrolling blade motion.

25 Claims, 4 Drawing Sheets

U.S. PATENT DOCUMENTS

| | | | |
|---|---|---|---|
| 7,065,884 B2 * | 6/2006 | Tam et al. | 30/376 |
| 7,234,243 B2 * | 6/2007 | Tam et al. | 30/393 |
| 7,526,867 B2 * | 5/2009 | Park | 30/392 |
| 2004/0128843 A1 | 7/2004 | Walker | |
| 2004/0168561 A1 | 9/2004 | Tam et al. | |
| 2005/0257385 A1 * | 11/2005 | Walker | 30/392 |
| 2006/0288592 A1 * | 12/2006 | Roberts | 30/392 |
| 2007/0180711 A1 * | 8/2007 | Park | 30/393 |

FOREIGN PATENT DOCUMENTS

| | | |
|---|---|---|
| DE | 26 50 470 | 5/1978 |
| DE | 198 05 675 | 8/1998 |
| DE | 103 28 061 | 1/2005 |
| WO | WO 2005/000510 | 1/2005 |

OTHER PUBLICATIONS

"New Skil Jigsaws are More Consumer Friendly", Aug. 17, 2001.
Black & Decker Jigsaws User Manual, Model Nos. KS629, KS630, KS631, KS633, KS634, KS635 and KS638, May 11, 1998.
Black & Decker Jigsaws User Manual, Model Nos. KS630, KS631, KS632, KS634, KS635 and KS638, Nov. 5, 1998.

* cited by examiner

RECIPROCATING CUTTING TOOL WITH ORBITAL ACTION

This is a continuation of application Ser. No. 10/603,300, filed Jun. 25, 2003 now U.S. Pat. No. 7,234,243.

BACKGROUND OF THE INVENTION

The present invention relates generally to hand-held power tools employing reciprocating working action, such as jigsaws or saber saws, and particularly to jigsaws capable of orbital cutting action.

It is known to provide jigsaws with orbital motion, in which the normally vertically reciprocating blade exerts a forward or lateral component of the cutting stroke. This type of orbital motion has been known to provide more effective cutting action.

One design criterion of such saws is that the main plunger, the shaft-like component to which the blade is attached and which reciprocates to provide the cutting motion, is also permitted a specified degree of forward and rearward play to effect orbital motion. Due to the relatively long length of the plungers, the provision of the pendulum-like orbital option often introduces flex and play in the operation of the plunger. This relatively large amount of flex makes it more difficult to accurately control the movement of the lower end of the plunger, which is also the attachment point of the blade. The result is cutting inefficiency and/or inaccuracy.

This relatively large amount of forward and backward flex in the plunger is caused by a swivel support typically fixed to the tool housing. The swivel support is rotated by an eccentric to exert a lateral biasing force on a rear or non-cutting edge of the blade. A drawback of this location is that insufficient mechanical force is applied to the rear of the blade to provide strong cutting action during the orbital stroke. In this manner, the potential cutting improvements of orbital cutting are not achieved.

It is also known to provide such tools with scroll cutting capability for making intricate designs and other projects involving tight cutting parameters. To date, tools were provided either capable of scroll cutting or orbital cutting, but not both, since the mechanisms for producing the respective cutting motions were considered incompatible.

Thus, there is a need for a cutting tool such as a jigsaw or similar cutting device which more effectively generates orbital action by the blade. In addition, there is a need for a jigsaw or similar cutting device which addresses the issue of support for the pendulum movement of the plunger for more accurate and effective orbital cutting. There is also a need for a jigsaw or similar cutting device which can provide both scroll cutting and orbital cutting motion.

BRIEF SUMMARY OF THE INVENTION

The above-listed needs are met or exceeded by the present reciprocating cutting tool, such as a jigsaw, which overcomes the limitations of the current technology. Among other things, the present tool is designed to provide operational support for the plunger, and more effective generation of the orbital blade motion. The former advantage is obtained in part by a hemispherical bearing connected to the plunger which supports orbital action. The latter advantage is obtained in part by mounting a swivel bracket on the foot plate for more direct application of orbital force to the point of cutting action. Also, a linkage is provided which selectively enables both scroll cutting and orbital cutting motion.

More specifically, the present reciprocating cutting tool configured for orbital cutting includes a housing, a power source disposed in the housing, a main linkage connected to the power source and to a blade for driving the blade in a vertically reciprocating motion, a foot plate connected to the housing and including a portion in operational relationship to the blade, a swivel bracket connected to the foot plate and disposed to exert an orbital force to a rear edge of the blade. A plunger is secured within the housing and connected to the linkage for reciprocating, pivotal and rotational movement, and has an end configured for receiving a blade. A selector mechanism for selecting between pivotal and rotational movement of the plunger, wherein pivotal movement relates to orbital blade motion and rotational movement relates to scrolling blade motion.

DETAILED DESCRIPTION OF THE INVENTION

Figure 1:
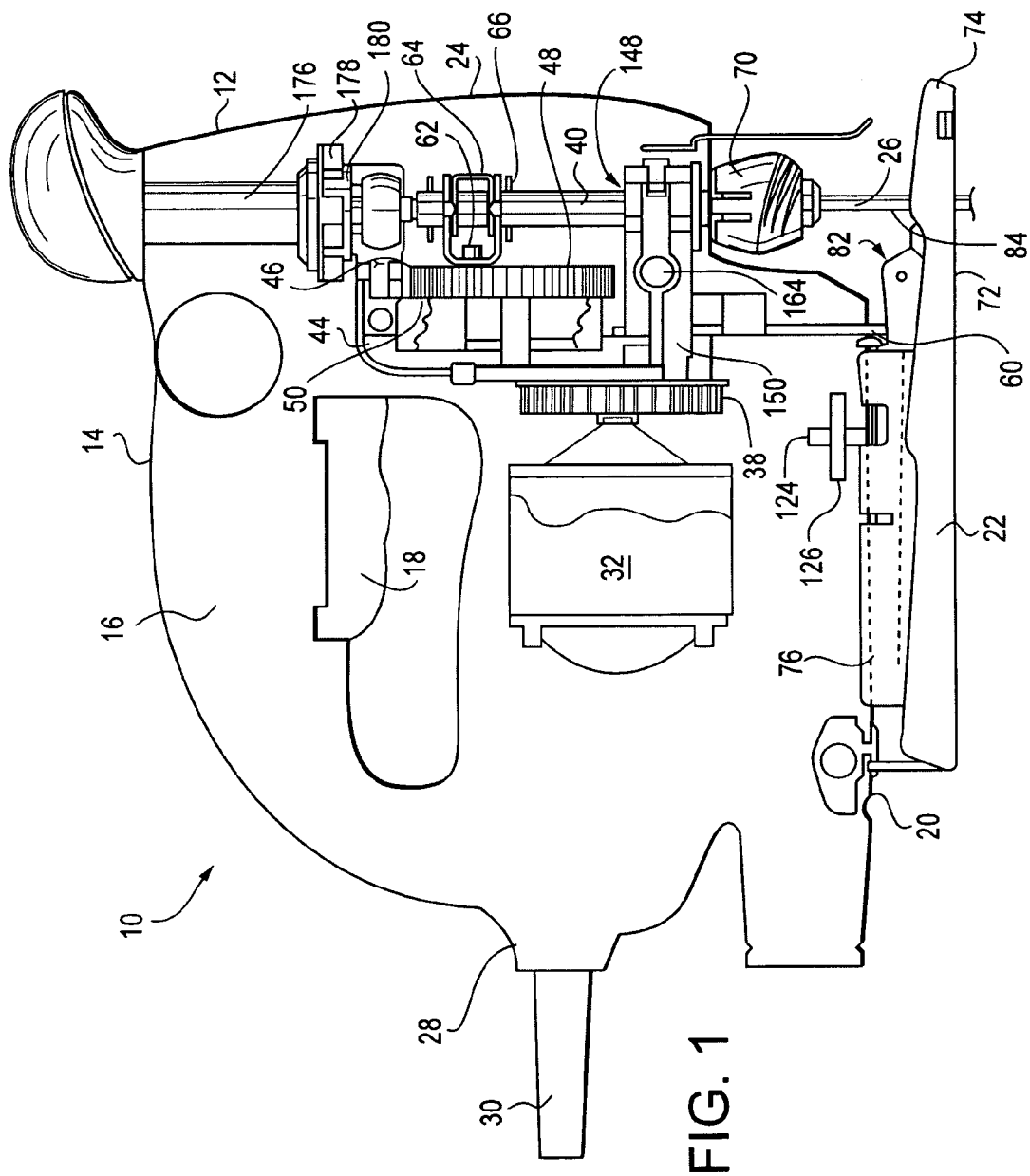
FIG. 1 is a vertical section of a jigsaw incorporating the present invention.
Figure 2A:
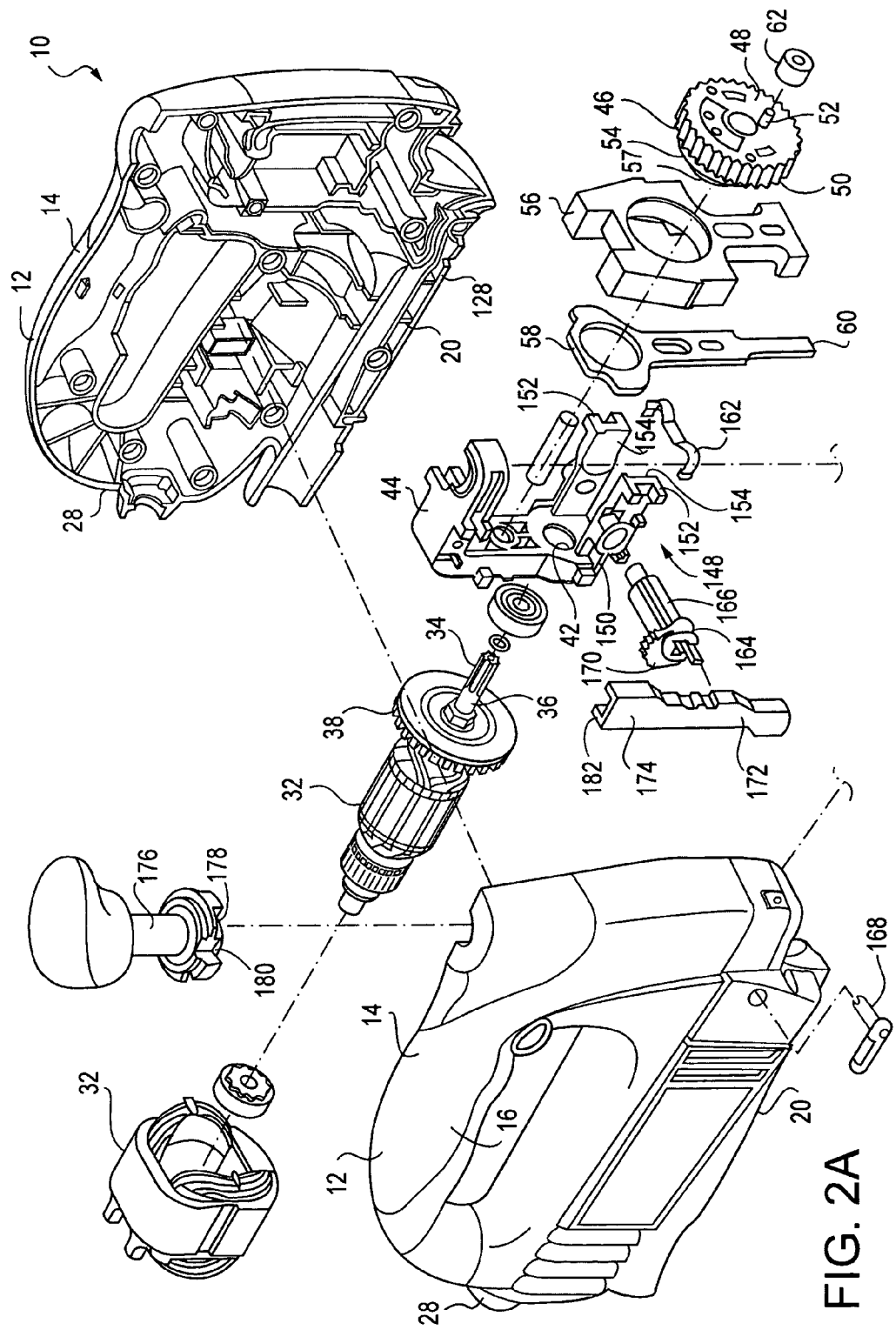
FIGS. 2A and 2B are an exploded perspective view of the jigsaw of FIG. 1, with portions omitted for clarity.
Figure 2B:
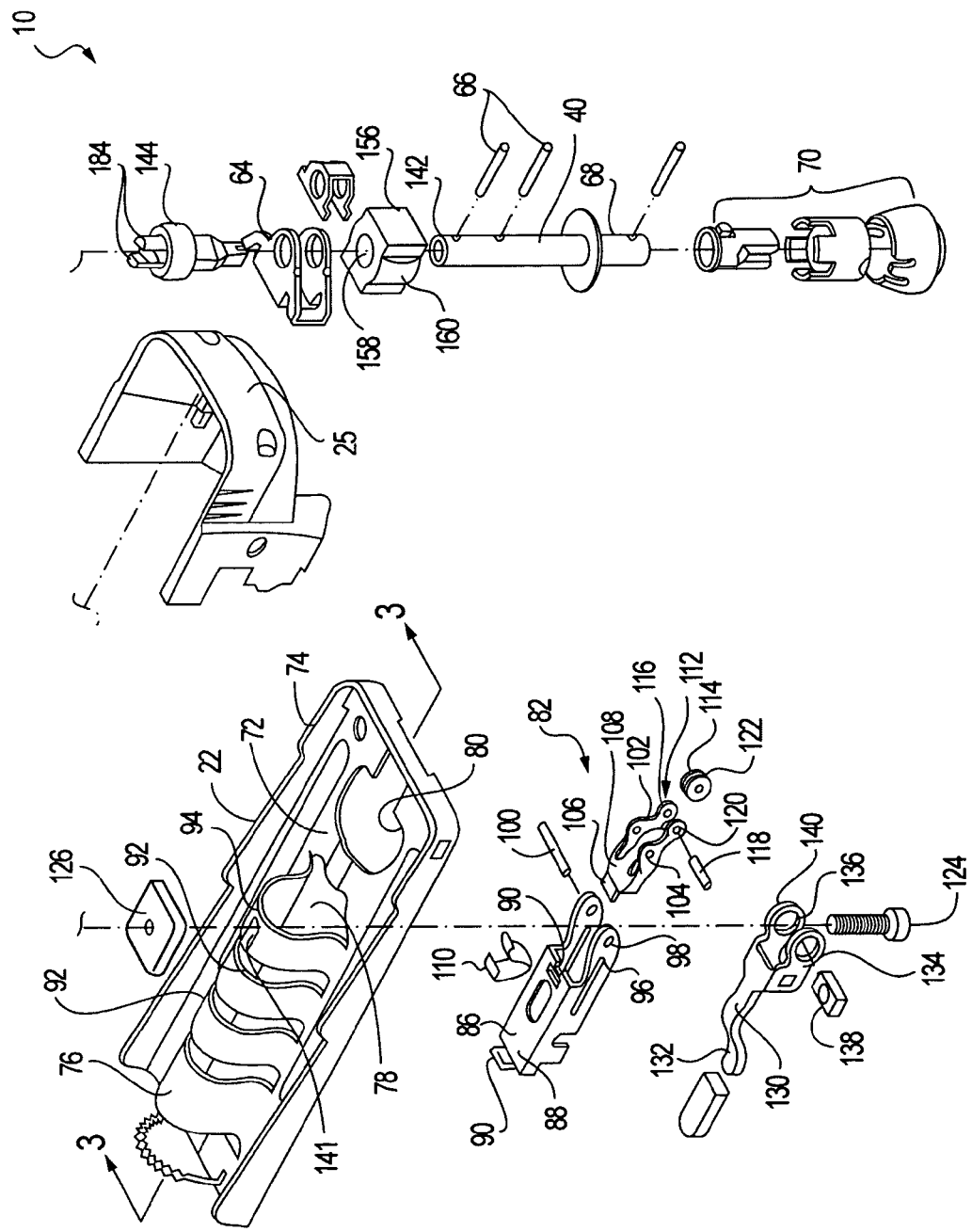

Referring now to FIGS. 1, 2A and 2B, a reciprocating cutting tool suitable for use with the present invention is generally designated 10. In the preferred embodiment, the tool 10 is a jigsaw, however other reciprocating cutting tools are contemplated as benefiting from the present invention, including but not limited to saber saws.

In the present invention, the term "orbital cutting motion" refers to the blade of the saw following a general elliptical cutting stroke. Orbital cutting motion has been found to achieve greater cutting efficiency from power tools, in that it resembles the motion of an individual putting relatively greater force or weight against a saw during a cutting stroke than a return stroke. In the case of jigsaws, the cutting edge of the blade is configured for cutting mainly in an upwardly directed cutting stroke. During orbital cutting motion, the otherwise vertically reciprocating blade is provided with a forward movement component as it ascends, and a rearward movement component as it descends. If the tip of the saw blade is observed during orbital motion, an elliptical blade path would be defined.

Scroll cutting motion or scrolling motion refers to the blade being rotated about its longitudinal axis while being reciprocated. This type of cutting motion is desired for creating intricate shapes in the work piece. As will be described in greater detail below, during scrolling cutting action, orbital motion is prevented.

The present tool 10 includes a housing 12 provided in various configurations for enclosing the internal components, and preferably taking the form of two halves split along a vertical plane and secured to each other by fasteners as is well known in the art. The tool 10 is shown in FIG. 1 in its operational orientation, and the housing has an upper end 14 defining a handle portion 16 in which is mounted an on/off trigger switch 18. Opposite the upper end 14, a lower end 20 provides the mounting point for a foot plate 22. Also included in the housing 12 is a front end 24 forming the operational location for the reciprocating blade 26. A cowl clamp 25 (FIG. 2B) may be provided for more securely holding the housing halves together. Opposite the front end 24 is a rear end 28 serving as the receiving point for a conventional power cord 30. However, it is contemplated that the present tool 10 may alternatively be battery powered, as is well known in the art. In the present application, the terms "upper", "lower", "front" and "rear" are used to refer to the tool 10 in the orientation shown in FIG. 1. It is contemplated that the tool 10 can be used in various orientations, including but not limited to inverted, sideways, etc., as is well known in the art, and these designations are merely provided to facilitate the explanation of the components of the present tool.

Connected to the power cord 30 is a power source in the form of an electric motor 32 transmitting rotary motion through a pinion gear 34 on an armature shaft 36 as is well known in the art (best seen in FIG. 2A). A circular fan 38 is preferably provided and secured to the armature shaft 36 for cooling the motor 32 during operation.

The pinion gear 34 is part of a main linkage connected to the motor 32 and to a plunger 40 to which the blade 26 is releasably attached, for causing the plunger to vertically reciprocate under the power provided by the motor 32. Passing through an aperture 42 in a generally "C"-shaped bearing plate 44, the pinion gear 34 engages a main ring gear 46 having a front surface 48 and a rear surface 50. An eccentric lug or pin 52 projects from the front surface 48 is preferably diametrically opposite, or 180° degrees out of phase of an eccentric boss 54 projecting from the rear surface 50. The boss 54 engages a counterweight 56 to balance the action of the plunger 40 and reduce operational vibration.

An additional, smaller pusher boss 57 projects from the boss 54 and engages a generally laterally flattened, elongate pusher 58 having a pushing end 60. The reciprocating pusher 58 is driven by the main linkage along a longitudinal axis which parallels, but is counter-directional to the reciprocating movement of the blade 26. In other words, when the blade 26 is in a "down" position, the pusher end 60 is in an "up" position. It is preferred that the pusher boss 57 is disposed at less than 180° out of phase from the lug 52. A preferred range of displacement is approximately 5-15°. This is because it has been found that greater cutting efficiencies are obtained when there is a slight lag between the movement of the pusher end 60 relative to the blade 26. The most orbital action or motion is desired during the midpoint of the ascending blade stroke. Thus, the orbital action generated by the pusher end 60 as described below need not begin until a period after the upward blade movement has begun.

Mounted on the eccentric lug 52 is a yoke bushing 62 (FIG. 2A) which is engaged in a yoke 64 (FIG. 2B) securely connected to the plunger 40 using pins 66 to reciprocate therewith. As the ring gear 46 rotates, the lug 52 rotates within the yoke bushing 62, and causes the yoke 64 to induce linear reciprocating motion to the plunger 40 in the form of a Scotch yoke, as is known in the art. In the same manner, rotary motion is transferred to linear motion to reciprocate the counterweight 56 and the pusher 58 in approximate opposite direction to the plunger 40. Thus, the main linkage includes the pinion gear 34, the ring gear 46, the lug 52 and the yoke 64.

A lower end 68 of the plunger 40 is fitted with a blade clamp 70, configured for releasably retaining the blade 26. Thus, during operation, reciprocating action of the plunger 40 will cyclically push the blade 26 below a plane defined by the foot plate 22 for cutting action on a work piece (not shown).

Figure 3:
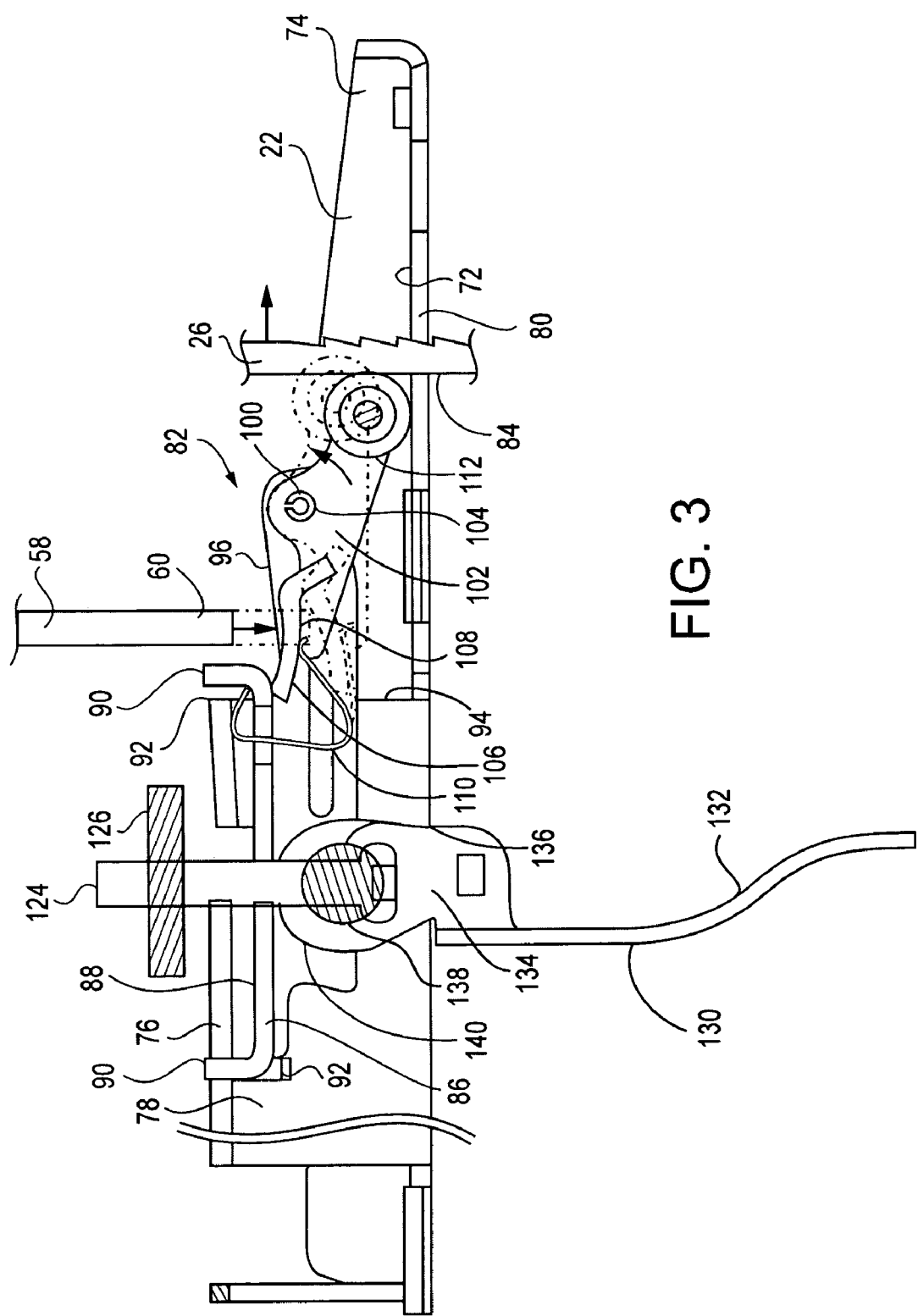
FIG. 3 is an enlarged fragmentary vertical section of the present plunger, swivel bracket and foot plate as shown in FIG. 1.

Referring now to FIGS. 2B and 3, the foot plate 22 includes a generally planar floor 72 surrounded on three sides by a generally vertically projecting lip 74, and a generally centrally located, raised, open-bottomed archway portion 76. The archway portion 76 defines a chamber 78, and while other orientations are contemplated, is preferably axially aligned with the housing 12. A generally circular blade aperture 80 is defined in the floor 72 and is dimensioned to accommodate the full degree of reciprocating and orbital movement of the blade 26 and the plunger 40. The blade aperture 80 is preferably located between a front end of the archway portion 76 and a forward-most portion of the vertically projecting lip 74. As such, the aperture 80 is in operational proximity to the blade 26. The foot plate 22 is preferably releasably secured to the lower end 20 of the housing 12. It will be appreciated that the construction of the foot plate 22, including the size, location and orientation of the raised archway portion 76 and/or the blade aperture 80 may vary to suit the application.

A swivel linkage, including a swivel bracket 82 is connected to the foot plate 22 and the housing 12 and is disposed to exert an orbital force to a rear edge 84 of the blade 26. More specifically, the swivel bracket 82 is located within the chamber 78 and is oriented to cyclically engage the rear edge 84 during reciprocating operation of the plunger 40 and exert an eccentric, orbital force upon the blade 26 subsequent to user control. This orbital movement is induced by contact by the pusher end 60 with the swivel bracket 82, described in further detail below. Thus, the pusher 58 is also part of the swivel linkage.

Included on the swivel bracket 82 is a main portion or holder 86 having a generally planar archway formation engaging surface 88. A generally vertically projecting tab 90 is preferably provided to each end of the surface 88. The tabs 90 each engage one of a plurality of grooves 92 in the raised archway portion 76 and a forward edge 94 of the archway portion. In this manner, the swivel bracket 82, together with the foot plate 22, is laterally slidable along a front-to-rear axis relative to the housing 12.

Projecting forwardly from the holder 86 is a pair of spaced arms 96 each having an eyelet 98, the two eyelets being aligned with each other. The eyelets 98 are dimensioned to receive a pivot pin 100 to which a rocker member 102 is pivotably attached. Being slightly curved or rocker-shaped, the rocker member 102 includes a pair of spaced pin apertures 104 dimensioned and configured for receiving the pivot pin 100 and preferably pivoting relative to the holder 86. It will be seen that the rocker member 102 is configured for operating in a see-saw motion when engaged by the pusher end 60. A rearwardly-projecting tab 106 is generally coplanar with an upper surface 108 of the rocker member 102, and the two surfaces define a landing end for the pusher end 60. During orbiting blade action, the pusher end 60 engages the landing to pivot the rocker member 102 in the above-described see-saw action, and cause a cyclical pressure upon the rear blade edge 84 (best seen in FIG. 3).

A spring clip 110 is connected between the holder 86 and the rearwardly-projecting tab 106 to bias the swivel bracket 82 so that the tab 106 is higher than an opposite blade engaging roller end 112. A main feature of the roller end 112 is a preferably grooved roller 114 rotatably engaged between a pair of spaced, generally parallel roller arms 116. To provide for rotation of the roller 114, a roller pin 118 is secured between the roller arms 116 in a pair of axle bores 120, which are eccentrically located relative to the pin apertures 104.

Due to the eccentric disposition of the axle bores 120, upon the reciprocating downward force exerted by the pusher end 60 on the rearwardly projecting tab 106, that force overcoming the biasing force of the spring clip 110, the roller 114 travels along an arc which intersects with the axis of reciprocation defined by the typical blade operation. As the roller 114 travels upward under the force of the pusher end 60, the roller engages and exerts a forward force against the rear blade edge 84, which in combination with the already vertical reciprocating movement, results in an orbital blade motion. A peripheral groove 122 is provided to the roller 114 for more accurate location and rolling engagement with the rear blade edge 84. It will be seen from FIG. 3 that the swivel bracket 82 is configured to engage the blade 26 at a location which is generally coplanar with the foot plate 22.

Since the tool 10 is preferably configured for selective operation in scrolling, orbital or standard reciprocating blade movement modes, it is important that the swivel bracket 82 be disengageable from the rear blade edge 84 when the user opts for either scrolling or standard reciprocating blade operation. This disengagement is achieved by providing the foot plate 22 with a mounting arrangement configured so that the foot plate and the attached swivel bracket 82, are laterally slidable away from the blade 26.

A threaded fastener 124 secures the swivel bracket 82 and the foot plate 22 to the lower end 20 of the housing 12 through threaded engagement with a preferably flattened nut 126. The nut 126 is secured within a cavity 128 in the housing 12 (FIG. 2A) and is polygonally shaped so that rotation relative to the housing is impossible. An off-center cam lever 130 is provided for releasably locking the position of the swivel bracket 82 and the foot plate 22 against the housing 12. The lever 130 includes a handle 132 at one end, and a pair of spaced, generally parallel arms 134. Each of the arms 134 has a yoke aperture 136 configured and dimensioned for receiving a yoke block 138. The yoke block 138 threadedly receives the fastener 124, and the arms 134 are provided with a cammed periphery 140. Upon appropriate threaded engagement between the fastener 124 and the nut 126 to a sufficient distance, movement of the handle 132 to a horizontal position exerts a holding/locking force against the underside of the holder 86, and with it the raised archway portion 76 of the foot plate 22, to hold both components securely against the housing 12.

To release the clamping force, the handle 132 is rotated to a vertical position (FIG. 3), and the cammed periphery 140 creates sufficient clearance between the holder 86 and the housing 12 that the parts can be moved as desired into, or out of engagement with the rear blade edge 84. Upon release of the clamping force, the foot plate 22 may be moved laterally relative to the housing. The degree of lateral travel is controlled by the length of an axially extending groove 141 which is dimensioned to engage the fastener 124. It will be appreciated that the length of the groove 141 will be at least as long as the amount of travel needed to place the swivel bracket 82 into engagement with the rear blade edge 84, and alternatively, to move the swivel bracket away from the blade edge for scrolling.

Referring now to FIGS. 1, 2A and 2B, when the tool 10 is selected for orbital cutting action induced by the swivel bracket 82 as discussed above, it is helpful for the plunger 40 to be supported along the orbital cutting stroke. An upper end 142 of the plunger 40 is provided with a spherical bearing 144 which permits a pendulum-like pivoting action required to enable orbital cutting. To support a lower end 68 of the plunger 40, a bottom bushing 148 is provided to support and accommodate the lateral movement of the plunger caused by orbital cutting.

The bottom bushing 148 is located in a lower arm 150 of the bearing bracket 44, which includes a pair of spaced apart, generally parallel legs 152 each defining an inwardly opening track 154. A bushing block 156 is provided, having a central throughbore 158 which slidably receives the plunger 40. At least one and preferably a pair of laterally opposed, convex or hemispherical surfaces 160 on the bushing block 156 slidingly engage complementary concave, hemispherical surfaces making up the track 154. Thus, as the plunger 40 moves laterally during the orbital cutting cycle in response to action of the pusher end 60 upon the swivel bracket 82, the bushing block 156, slidably supported in the track 154, supports the lower end 146 of the plunger 40. Between orbital force pulses, the plunger 40 returns to a base position, through the counteractive force exerted by the work piece, as well as by a spring clip 162 located at the end of the arm 150 exerting a biasing force against the bushing block 156.

Depending on the work piece and/or the project being addressed, more or less aggressive cutting action may be desired. The force of the orbital cutting action may be adjusted by changing the orbital stroke. In the present tool 10, adjusting the amount of lateral travel of the bushing block 156 in the track 154 is a way of adjusting the orbital stroke. To this end, an orbital control in the form of an orbital pin 164 is transversely mounted in the lower arm 150 of the bearing bracket 44 for engaging the bushing block 156 and thus controlling the amount of lateral movement of the plunger 40. More specifically, the orbital pin 164 provided with at least one progressively dimensioned or stepped cam surface 166 for selectively limiting the amount of lateral movement of the plunger 40 depending on the rotational position of the orbital pin 164. The profile of the orbital pin 164 is such that one surface portion, or one of the cam surfaces 166 of the pin, permits no lateral movement of the plunger 40, so that the plunger may be converted to scrolling or standard reciprocating operation. Another portion of the cam surface 166 permits full orbital stroke, or full travel of the bushing block 156 in the track 154.

A selector knob 168 is located external of the housing 12 and is attached to an end of the orbital pin 164. Rotation of the selector knob 168 causes rotation of the pin 164 to adjust the orbital stroke as described above. At one end of the orbital pin 164 is found a radially-extending wedge shaped cam 170 which extends in an opposite or offset direction from the cam surface 166. The cam 170 engages a lower end 172 of a scroll lock arm 174, extending up to a scroll adjustment knob 176. A lower end 178 of the scroll adjustment knob 176 has a dentate formation 180 which is lockingly received in an upper end 182 of the scroll lock arm 174. The wedge-shaped cam 170 is oriented on the orbital pin 164 so that in any of the positions of the pin which permit orbital action, the scrolling action induced by rotation of the scroll adjustment knob 176 is prevented. Through a mating engagement with prongs 184 (FIG. 2B) extending from the upper spherical bearing 144, the scroll adjustment knob 176 is connected to an upper end of the plunger 40. As such, rotation of the knob 176 controls the scrolling action of the blade 26.

Thus, it will be seen that the present reciprocating cutting tool provides the user with the choice between standard reciprocating cutting, progressive amounts of orbital cutting action, and scrolling cutting action in a single tool. The internal linkages and controls of the present tool are such that the rotation of a single selector level allows the tool to be converted between orbital and scrolling or standard reciprocating action. Further, the reciprocating plunger is supported at its lower end during orbiting action by a bushing. Orbiting action is created by cyclical action directly applied against a rear blade edge, thus providing effective use of orbital generating force.

While a particular embodiment of the present reciprocating cutting tool with orbital action has been described herein, it will be appreciated by those skilled in the art that changes and modifications may be made thereto without departing from the invention in its broader aspects and as set forth in the following claims.

The invention claimed is:

1. A reciprocating cutting tool configured for orbital cutting, comprising:
   a housing;
   a power source disposed in said housing;
   a main linkage connected to said power source and to a blade for driving the blade in a vertically reciprocating motion;
   a swivel bracket connected to a foot plate and disposed to exert a force to a rear edge of the blade wherein said swivel bracket includes a holder configured for mounting to said foot plate, and a rocker member pivotally joined to said holder, the rocker member having a blade engaging end for engaging the rear of the blade to create an orbital motion, and a landing end opposite the blade engaging end, said landing end being biased toward said housing, a reciprocating pusher engaging said landing end to pivot the blade engaging end in an arc against the blade, causing an orbital action;
   a swivel linkage driven by said main linkage for exerting an eccentric force on said swivel bracket for creating said force on the blade, wherein said swivel linkage includes said reciprocating pusher that is driven by said main linkage along a longitudinal axis which parallels the movement of the blade; and
   said foot plate being connected to said housing and including a portion in operational proximity to the blade.

2. The tool of claim 1 further including a roller on the blade engaging end of said rocker member, said roller configured for rotatably engaging the blade.

3. A reciprocating cutting tool configured for orbital cutting, comprising:
   a housing;
   a power source disposed in said housing;
   a main linkage connected to said power source and to a blade for driving the blade in a vertically reciprocating motion;
   a foot plate connected to said housing and including a portion in operational proximity to the blade; and
   a swivel bracket directly connected to said foot plate and disposed to exert a force to a rear edge of the blade for moving the blade forwardly;
   wherein said foot plate is laterally slidable on said housing to move said swivel bracket out of engagement with the blade.

4. The tool of claim 3 further including a swivel linkage driven by said main linkage for exerting an eccentric force on said swivel bracket for creating said force on the blade.

5. The tool of claim 4 wherein said swivel linkage includes a reciprocating pusher driven by said main linkage along a longitudinal axis which parallels the movement of the blade.

6. The tool of claim 5, wherein said swivel bracket includes a portion configured for operating in a see-saw motion when engaged by said pusher.

7. The tool of claim 3 wherein said swivel bracket is configured to engage the blade at a location which is generally coplanar with said foot plate.

8. The tool of claim 3 wherein said main linkage includes an elongate plunger operated by a scotch yoke mechanism for vertical reciprocating motion relative to said housing, a lower end of said plunger being configured for receiving the blade.

9. The tool of claim 8 further including a bottom bushing supporting the lower end of said plunger and accommodating lateral movement of the plunger.

10. A reciprocating cutting tool configured for orbital cutting, comprising:
    a housing;
    a power source disposed in said housing;
    a main linkage connected to said power source and to a blade for driving the blade in a vertically reciprocating motion;
    a swivel bracket connected to a foot plate and disposed to exert a force to a rear edge of the blade;
    a swivel linkage driven by said main linkage for exerting an eccentric force on said swivel bracket for creating said force on the blade; and
    said foot plate being connected to said housing and including a portion in operational proximity to the blade, wherein said foot plate is laterally slidable on said housing to move said swivel bracket out of engagement with the blade.

11. The tool of claim 10 wherein said swivel bracket has a swivel bracket holder connected to said foot plate by a pair of tabs so that said swivel bracket moves with said foot plate.

12. The tool of claim 10 further including a cam lever lock for releasably locking said foot plate and said swivel bracket in relation to said housing.

13. The tool of claim 10 wherein said main linkage includes a plunger configured for reciprocating movement relative to said housing and having an end configured for accommodating the blade, said plunger convertible for scrolling or standard reciprocating operation upon the sliding of said swivel bracket out of engagement.

14. A reciprocating cutting tool configured for orbital cutting, comprising:
    a housing;
    a power source disposed in said housing;
    a main linkage connected to said power source and to a blade for driving the blade in a vertically reciprocating motion, said main linkage including an elongated plunger operated by a scotch yoke mechanism for vertical reciprocating motion relative to said housing, a lower end of said plunger being configured for receiving the blade;
    a foot plate connected to said housing and including a portion in operational proximity to the blade;
    a swivel bracket directly connected to said foot plate and disposed to exert a force to a rear edge of the blade;
    a bottom bushing supporting the lower end of said plunger and accommodating lateral movement of the plunger, wherein said bottom bushing includes a track and said plunger is equipped with a bushing block having at least one surface for engaging said track for guiding lateral movement of said plunger.

15. The tool of claim 14 wherein said track and said bushing block have complementary hemispherical surfaces.

16. The tool of claim 14 further including an orbital control disposed in said bottom bushing for controlling the amount of lateral movement of said plunger.

17. The tool of claim 16 wherein said orbital control is an orbital pin transversely mounted in said bottom bushing and having at least one cam surface for selectively limiting the amount of lateral movement of said plunger depending on the rotational position of said orbital pin.

18. The tool of claim 17 wherein a portion of said at least one cam surface of said orbital pin permits no lateral movement of said plunger, so that said plunger can be converted to scrolling or standard reciprocating operation.

19. A reciprocating cutting tool configured for orbital cutting, comprising:
    a housing;
    a power source disposed in said housing;

a main linkage connected to said power source and to a blade for driving the blade in a vertically reciprocating motion;

a foot plate connected to said housing and including a portion in operational proximity to the blade; and a swivel bracket connected to said foot plate and disposed to selectively exert a force to a rear edge of the blade for moving the blade forwardly; and a plunger having a first end connected to a spherical bearing, and a second end connectable to the blade, said spherical bearing supporting said plunger near said first end during an orbital motion;

wherein said foot plate is laterally slidable on said housing to move said swivel bracket out of engagement with the blade.

20. The tool of claim 19 wherein said spherical bearing includes a pair of spaced spherical surfaces secured to said plunger and a track defining a lateral forward and back range of movement for said surfaces, said track including concave surfaces configured for accommodating lateral movement of said spherical surfaces as said plunger affects said orbital motion.

21. A reciprocating cutting tool configured for orbital cutting, comprising:

a housing;

a power source disposed in said housing;

a plunger having a first end connected to a spherical bearing, and a second end connectable to a blade, said spherical bearing supporting said plunger near said first end during an orbital motion and includes a pair of spaced spherical surfaces secured to said plunger and a track defining a lateral forward and back range of movement for said surfaces, said track including concave surfaces configured for accommodating lateral movement of said spherical surfaces as said plunger affects said orbital motion;

an orbital pin which is selectively rotatable to adjust the amount of travel of said spherical surfaces and said plunger in said track from no movement to full orbital movement;

a main linkage connected to said power source and to the blade for driving the blade in a vertically reciprocating motion;

a foot plate connected to said housing and including a portion in operational proximity to the blade; and a swivel bracket connected to said foot plate and disposed to exert a force to a rear edge of the blade.

22. An electric jigsaw, comprising:

a housing;

a power source disposed within said housing;

a main linkage disposed within said housing and connected to said power source;

a plunger secured within said housing and connected to said linkage for reciprocating, pivotal and rotational movements, and having an end configured for receiving a blade; and a selector mechanism for selecting between said pivotal and said rotational movements of said plunger, a foot plate connected to said housing; and a swivel bracket mechanism operatively connected to said foot plate and selectively positioned to exert a force to a rear edge of the blade and cause said plunger to exhibit pivotal movement;

wherein said pivotal movement relates to orbital blade motion, and said rotational movement relates to scrolling blade motion, and said foot plate is laterally slidable on said housing to move said swivel bracket mechanism out of engagement with the blade to enable said plunger to exhibit said rotational movement.

23. An electric jigsaw, comprising:

a housing;

a power source disposed within said housing;

a main linkage disposed within said housing and connected to said power source;

a plunger secured within said housing and connected to said linkage for reciprocating, pivotal and rotational movements, and having an end configured for receiving a blade; and a selector mechanism for selecting between said pivotal and said rotational movements of said plunger, and a swivel bracket mechanism selectively positioned to exert a force to a rear edge of the blade and cause said plunger to exhibit pivotal movement;

wherein said pivotal movement relates to orbital blade motion, and said rotational movement relates to scrolling blade motion, and wherein said selector mechanism includes a transverse orbit pin and a scroll lock arm, said scroll lock arm being operatively connected to said orbit pin and being adjustable at least between a first position for preventing scrolling during pivoting motion by said plunger, and a second position preventing pivoting action and permitting rotational motion.

24. An electric jigsaw, comprising:

a housing;

a power source disposed within said housing;

a main linkage disposed within said housing and connected to said power source;

a plunger located within said housing and having an end configured for receiving a blade, said plunger being connected to said linkage and being capable of generally vertical reciprocating movement, rotational scrolling movement and orbital movement;

a foot plate connected to said housing; and a selector mechanism for alternatively selecting scrolling and orbital movements, and a rocker member operatively connected to said foot plate and selectively positioned to exert a force to a rear edge of the blade for moving the blade forwardly;

wherein said foot plate is laterally slidable on said housing to move said rocker member out of engagement with the blade.

25. An electric jigsaw having scrolling and orbital operational capability, comprising:

a housing;

a motor in said housing;

a generally vertical elongated reciprocating plunger to which a blade can be attached at its lower end;

a drive mechanism interconnecting said motor and said plunger and supporting said plunger to facilitate reciprocating, scrolling and orbital movements, said drive mechanism being configured to selectively exert a force to the rear edge of an attached blade for moving the blade forwardly during orbital operation;

a foot plate connected to said housing;

a swivel bracket mechanism operatively connected to said drive mechanism and said foot plate and selectively positioned to exert the force to the rear edge of the blade; and a selector mechanism for alternatively selecting scrolling and orbital operations;

wherein said foot plate is laterally slidable on said housing to move said swivel bracket mechanism out of engagement with the blade during the scrolling operation.

* * * * *